United States Patent [19]

Mitsunaga et al.

[11] Patent Number: 4,847,173
[45] Date of Patent: Jul. 11, 1989

[54] ELECTRODE FOR FUEL CELL

[75] Inventors: Tatsuo Mitsunaga; Hideaki Miyoshi, both of Kobe, Japan

[73] Assignee: Mitsubishi Denki Kabushiki Kaisha, Tokyo, Japan

[21] Appl. No.: 139,571

[22] Filed: Dec. 30, 1987

[30] Foreign Application Priority Data

Jan. 21, 1987 [JP] Japan ................................ 62-12812
Jan. 21, 1987 [JP] Japan ................................ 62-12815

[51] Int. Cl.$^4$ ............................................. H01M 4/86
[52] U.S. Cl. ....................................... 429/41; 429/42; 429/44
[58] Field of Search ..................... 424/41, 44, 34–39, 424/42

[56] References Cited

U.S. PATENT DOCUMENTS

| 4,129,685 | 12/1978 | Damiano | 429/44 X |
| 4,517,260 | 5/1985 | Mitsuda | 429/41 |
| 4,542,079 | 9/1985 | Takeuchi et al. | 429/41 X |
| 4,603,060 | 7/1986 | Mitsuda et al. | 429/115 |
| 4,661,423 | 4/1987 | Ueno et al. | 429/41 |

Primary Examiner—Stephen J. Kalafut
Attorney, Agent, or Firm—Oblon, Spivak, McClelland, Maier & Neustadt

[57] ABSTRACT

An electrode for fuel cell which is constructed with an electrode base, a catalyst layer, and a matrix layer, wherein one or whole part of the catalyst layer and one or whole part of the matrix layer are formed in a porous sheet in juxtaposed relationship.

9 Claims, 2 Drawing Sheets

ELECTRODE FOR FUEL CELL

BACKGROUND OF THE INVENTION

1. FIELD OF THE INVENTION

This invention relates to an electrode for a fuel cell, and, more particularly, it is concerned with an improved structure of such electrode.

2. DISCUSSION OF BACKGROUND

FIG. 4 of the accompanying drawing indicates a cross-section of a conventional electrode for a fuel cell, in which a reference numeral 1 designates an electrode base, a numeral 2 refers to a catalyst layer, 3 denotes a catalyst penetrated layer, and 4 a matrix layer.

In the following, the method of manufacturing the electrode will be explained. The electrode base 1 should have electrical conductivity and gas permeability, and is obtained by immersing such porous and electrically conductive sheet like carbon paper in a dispersion liquid of polytetrafluoroethylene (hereinafter simply referred to as "PTFE") or by applying such dispersion liquid of PTFE onto such sheet to render it water-repellent.

The catalyst layer 2 is formed, for example, by applying on the above-mentioned electrode base 1 catalyst paste containing therein catalyst powder obtained by having fine particles of platinum carried on the surface of carbon powder and PTFE as a binder, which is heat-treated to a temperature of, for example, 300° C. to 350° C. The matrix layer 4 is formed, for example, by applying on the above-mentioned catalyst layer 2 matrix paste containing therein silicon carbide powder and PTFE as a binding agent, which is heat-treated to a temperature of, for example, 300° C. to 350° C. The catalyst layer 2 and the matrix layer 4 may be heat-treated either separately or jointly.

The above-mentioned catalyst paste and matrix paste may be applied by the spraying method, the curtain coating method, the doctor blade method, and so on. By the application of the above-mentioned catalyst paste on the electrode base 1, there is formed the catalyst penetrated layer 3 owing to penetration of the catalyst paste into the electrode base 1, the depth of which varies depending on various conditions such as diameter of the pores in the electrode base 1, intensity of the water-repellent property, viscosity of the catalyst paste, and so forth. It can therefore be said that depth of the catalyst penetrated layer 3 tends to be readily affected by production lots of the electrode base 1 and the catalyst paste. Further, if the pore diameter and the intensity of water-repellent property are not uniformly distributed in one and the same electrode base 1, the depth of the catalyst penetrated layer 3 becomes non-uniform in its distribution. In addition, PTFE used for treating the electrode base 1 to have the required water-repellent property becomes molten at the time of heat-treatment of the electrode base at a temperature of from 300° C. to 350° C. after application of the catalyst paste, which causes the pore structure of the catalyst layer 2 to change.

Since the conventional electrode for the fuel cell is constructed as mentioned above, there has been a point of problem such that the catalyst paste penetrates into the interior of the electrode base 1 and the pore of the electrode base 1 are filled with the catalyst powder and the binding agent, on account of which the electrode base 1 has a reduced gas diffusibility. In the case of an electrode such as the electrode with rib, wherein an electrolyte is held in the interior of the electrode base 1, there has been a point of problem such that the volume of pores decreases to lower the sustaining quantity of the electrolyte, hence shortened service life of the cell. Also, since the catalyst penetrated into the electrode base 1 is not effectively utilized in the cell reaction, there has been a point of problem such that the utility of the catalyst is low. Further, when the electrode base 1 subjected to the water-repellent treatment, there has been a point of problem such that the electrolyte like phosphoric acid, etc. can be impregnated by application only from the surface side of the matrix layer. Furthermore, the conventional electrode for the fuel cell has its disadvantage such that the catalyst layer 2 and the matrix layer 3 have poor adhesive property, which readily brings about peeling and cracking of the matrix layer 3.

SUMMARY OF THE INVENTION

It is an object of the present invention to provide an electrode for a fuel cell which is capable of improving gas diffusibility of the electrode base, increasing sustaining quantity of the electrolyte in the electrode base, and increasing utility of the catalyst.

It is another object of the present invention to provide an electrode for a fuel cell which has an improved adhesive property between the catalyst layer and the matrix layer, hence rendering it difficult to bring about peeling or cracking of the matrix layer.

According to the present invention in general aspect of it, there is provided an electrode for a fuel cell, which comprises in combination an electrode base, a catalyst layer, and a matrix layer, a part or the entire part of said catalyst layer and a part of the entire part of said matrix layer being formed in a porous sheet in contiguity to each other.

The foregoing objects, other objects as well as the specific construction of the electrode for the fuel cell according to the present invention will become more apparent and understandable from the following detailed description of preferred embodiments thereof, when read in conjunction with the accompanying drawing.

BRIEF DESCRIPTION OF ACCOMPANYING DRAWING

DETAILED DESCRIPTION OF THE PREFERRED EMBODIMENT

The porous sheet to be used for the fuel cell electrode according to the present invention should desirably have its porosity of, for example, 50% or above (or preferably, 75% or above), As an example, a carbon fiber sheet having thickness in a range of from 30 to 300 μm (or preferably, from 50 to 200 μm) is excellent. In case a catalyst adhered layer is provided to the side of the catalyst layer, its thickness should desirably be in a range of, for example, from 10 to 300 μm (or preferably from 50 to 150 μm); and, in the case of providing a matrix adhered layer to the side of the matrix layer, its thickness should desirably be in a range of, for example, from 30 to 300 μm (or preferably from 50 to 200 μm). Total thickness of the entire catalyst layer including the catalyst adhered layer should be in a range of, for example, from 50 to 400 μm (or preferably, from 100 to 300 μm). The entire matrix layer including the matrix adhered layer should have its total thickness in a range of, for example, from 50 to 500 μm (or preferably, from 100 to 300 μm).

The above-mentioned catalyst layer is composed of catalyst powder and a binding agent. The catalyst powder consists of fine particles of platinum which is carried on the surface of carbon powder. For the binding agent, fluorine-containing resins such as polytetrafluoroethylene (PTFE), copolymers of tetrafluoroethylene/hexafluoropropylene (hereinafter referred to simply as "FEP"), and others are suitable.

The above-mentioned matrix layer is composed of a matrix skeletal material and a binding agent. For the matrix skeletal material, use is made of carbon, inorganic compounds, phosphates of metals, and so forth. Of the inorganic compounds to be used as the matrix skeletal material, there are zirconium oxide, silica alumina, silica-alumina, niobium oxide, tantalum oxide, tungsten oxide, titanium oxide, silicon nitride, boron carbide, tungsten carbide, silicon carbide, and so on, all being in the form of powder or fiber, of which silicon nitride and silicon carbide are excellent. Of the phosphates of metals, preferred use may be made of salts of phosphoric acid with silicon, titanium, tin, aluminum, zirconium, etc., for example, $SiP_2O_7$, $ZrP_2O_7$, and so forth. As the binding agent, PTFE, FEP, and other fluorine-containing resins are suitable. In addition, for the purpose of improving sustainability of the electrolyte such as phosphoric acid, etc. in the matrix, inclusion in the above-mentioned binding agent of polyether sulfone, polyether/etherketone, polyphenylene sulfide, and other hydrophilic thermoplastic resins may bring about favorable result.

In the following, the one embodiment of the present invention will be explained.

Figure 1:
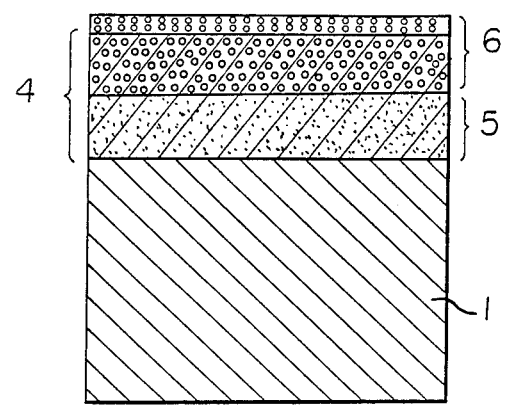
FIG. 1 is a cross-sectional view showing the electrode for the fuel cell according to one embodiment of the present invention.

In FIG. 1, a reference numeral 1 designates the electrode base, and a numeral 4 refers to a porous sheet, inside which the catalyst layer 5 and the matrix layer 6 are formed in juxtaposition.

This embodiment of FIG. 1 uses an electrically conductive carbon paper as the porous sheet 4, and the matrix layer 6 is also formed on the surface of the porous sheet 4 with a view to securing electronic insulation of the matrix layer 6.

In the following, explanations will be given as to the method for production of the fuel cell electrode according to the present invention. The electrode base 1 having both electric conductivity and gas permeability is obtained by immersing carbon paper having a thickness of, for example, 400 μm and porosity of, for example, 75% in a dispersion liquid of PTFE, after which it is dried and baked for rendering the same to be water-repellent. Using carbon paper having thickness of, for example, 200 μm and porosity of, for example, 75%, and the porous sheet, the catalyst paste prepared by mixing the catalyst of carbon powder, on which fine particles of platinum are carried, and the dispersion liquid of PTFE was filled in this carbon paper from one surface side thereof, followed by drying and baking the same to form the catalyst layer 5; thereafter, the matrix paste prepared by mixing fine particles of the matrix material (e.g., silicon carbide) and the dispersion liquid of PTFE as the binding agent was filled on this carbon paper from the other surface side thereof, followed by dring and baking the same to form the matrix layer 6.

These catalyst paste and matrix paste are filled in the carbon paper by the spraying method, the filtration method, the doctor blade method, the reverse roll coater method, the screen printing method, and any other appropriate methods.

The electrode base 1, the catalyst layer 5, and the matrix layer 6 may be combined into an integral member by laminating them at the time of assembling the fuel cell. It may however be more preferable that they are combined in advance by pressing or rolling.

Figure 2:
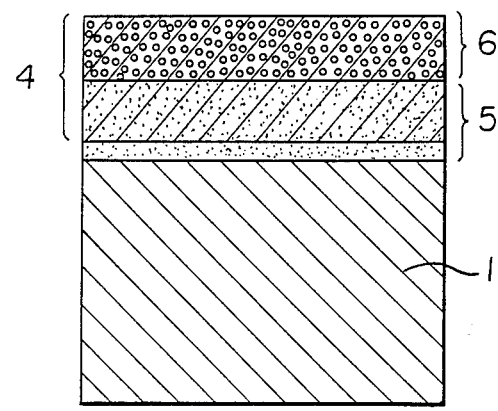
FIG. 2 is also a cross-sectional view showing the electrode for the fuel cell according to another embodiment of the present invention.

In the above described embodiment of the present invention, use of the electrically conductive carbon paper as the porous sheet 4 has been shown as an example, although it may be feasible to use a non-conductive sheet. In the latter case, shown in FIG. 2 the catalyst layer 5 should be formed on the surface thereof to the side of the electrode base 1 so as to secure the electrical conductivity between the electrode base 1 and the catalyst layer 5.

As has been mentioned in the foregoing, this first embodiment of the present invention forms the catalyst layer and the matrix layer inside the porous sheet in a juxtaposed relationship, which gives effect of obtaining the fuel cell electrode of high performance and stable quality.

Figure 3:
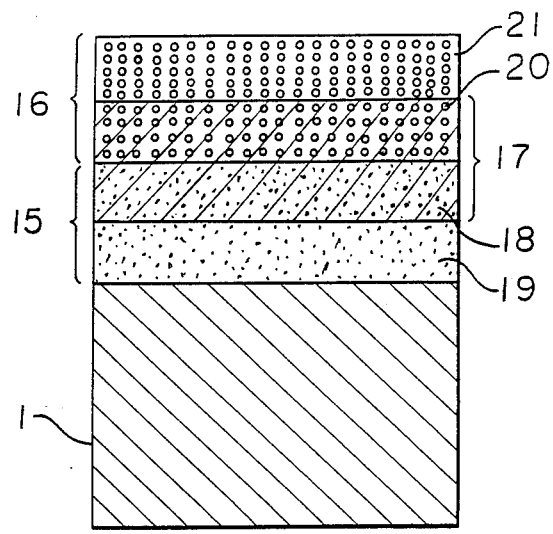
FIG. 3 is a cross-sectional view showing an electrode/matrix combination according to further embodiment of the present invention.
Figure 4:
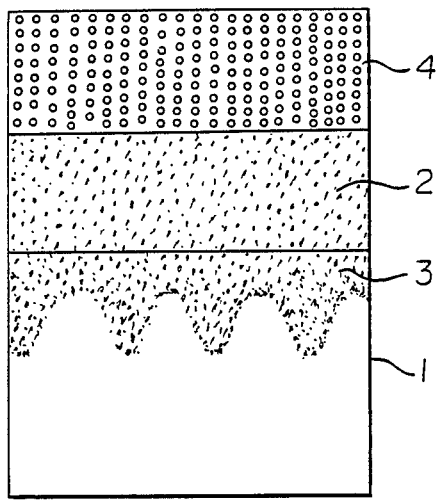
FIG. 4 is a cross-sectional view of a conventional electrode for a fuel cell.

In the following, another embodiment of the present invention will be explained in reference to FIG. 3. In the drawing, a reference numeral 1 designates the electrode base, a numeral 15 refers to a catalyst layer, 16 denotes the matrix layer, and 17 the porous sheet, both catalyst layer 15 and matrix layer 16 forming an integral body of catalyst/matrix layer combination.

The catalyst/matrix layer combination consists of: the catalyst layer 15 which is composed of a catalyst filled layer 18 formed by filling the porous sheet 17 with the catalyst powder and the binding agent from one surface side thereof, and a catalyst adhered layer 19 formed by adhering the catalyst powder and the binding agent onto the surface of the above-mentioned catalyst filled layer 18; and the matrix layer 16 which is composed of a matrix filled layer 20 formed by filling the above-mentioned porous sheet 17 with the matrix skeletal material and the binding agent from the other surface side thereof, and a catalyst adhered layer 21 formed by adhering the matrix skeletal material and the binding agent onto the surface of the above-mentioned matrix filled layer 20.

In the following, explanations will be given as to the method for producing the fuel cell electrode according to the embodiment of the present invention. The electrode base 1 is obtained by immersing carbon paper having thickness of, for example, 300 μm and porosity of, for example, 75% in a dispersion liquid of PTFE, followed by drying the same, and then it is heat-treated at a temperature of, for example, 360° C. to render it water repellent.

The catalyst layer 15 is manufactured in the following manner. As the porous sheet 17, use is made of carbon paper having thickness of, for example, 100 μm and porosity of, for example, 80%. The porous sheet is then filled with the catalyst powder prepared by having fine particles of platinum carried on the surface of carbon powder and PTFE as the binding agent, to thereby form the catalyst filled layer 18. Subsequently, on the surface of this catalyst filled layer 18, there are adhered the catalyst powder of the exactly same composition as that used for forming the above-mentioned catalyst filled layer 18 and the PTFE as the binding agent, thereby forming the catalyst adhered layer 19. By the way, the catalyst powder and the binding agent are prepared in the form of aqueous paste, which is filled in, and adhered onto, the porous sheet 17 by means of the reverse roll coater method, etc. Subsequently, the sheet as filled with the catalyst paste is dried and heat-treated at a temperature of, for example, 350° C. to complete formation of the catalyst layer 15. The total thickness of the catalyst layer 15 is, for example, 200 $\mu$m, while the thickness of the catalyst adhered layer 18 is, for example, 150 $\mu$m. This catalyst layer 15 is flexible, and constitutes an independent film layer having its self-sustaining property, which permits it to be handled manually.

The matrix layer 16 is manufactured in the following manner. That is to say, the porous sheet 17, in and on which the above-mentioned catalyst layer 15 has been formed, is reversed, and then the matrix filled layer 20 is formed therein by filling silicon carbide powder as the matrix skeletal material and PTFE as the binding agent. Subsequently, onto the surface of this matrix filled layer 20, there are adhered silicon carbide powder, as the matrix skeletal material, of the exactly same composition as that used in the above-mentioned matrix filled layer 20, and PTFE as the binding agent to thereby form the matrix adhered layer 21. By the way, both matrix skeletal material and binding agent are prepared in the form of aqueous paste, which is filled in, and adhered onto, the porous sheet 17 by means of the reverse roll coater method, etc. Subsequently, the sheet as filled with the matrix paste is dried and heat-treated at a temperature of, for example, 250° C. to thereby complete formation of the matrix layer 16. The total thickness of the matrix layer 16 is, for example, 200 $\mu$m, while the thickness of the matrix adhered layer 21 is, for example, 150 $\mu$m. In this way, there can be obtained the catalyst/matrix layer combination, in which the catalyst layer 15 and the matrix layer 16 are made integral. This catalyst/matrix layer combination is flexible, and constitutes an independent film layer having its self-sustaining property, which permits it to be handled manually. The electrode base 1 and the catalyst/matrix layer combination obtained by the above-mentioned method are laminated into a single integral body at the time of assembling the fuel cell, thereby forming an electrode/matrix combination.

In the above described example, the reverse roll coater method is employed for filling and adhering the catalyst paste and the matrix paste in and onto the porous sheet 17. While it may also be possible to use the spraying method, etc., the reverse roll coater method is the most suited. Further, in the above described embodiment, the electrode base 1 and the catalyst/matrix combination are laminated into a single integral body at the time of assembling the fuel cell. It is also possible that both of them are made integral beforehand by pressing or rolling.

According to this embodiment of the invention, the electrode/matrix combination for the fuel cell is separated into the electrode base and the catalyst/matrix layer combination, and this catalyst/matrix layer combination is constructed with the catalyst layer which is composed of the catalyst filled layer formed by filling the porous sheet with the catalyst powder and the binding agent from one surface side thereof, and the catalyst adhered layer formed by adhesion of the catalyst powder and the binding agent on the surface of the above-mentioned catalyst filled layer; and the matrix layer which is composed of the matrix filled layer formed by filling the above-mentioned porous sheet with the matrix skeletal material and the binding agent from the other surface side thereof, and the matrix adhered layer formed by adhesion of the matrix skeletal material and the binding agent on the surface of the above-mentioned matrix filled layer. With such construction of the fuel cell electrode, there can be accured various advantageous effects such that the electrode base has good gas diffusibility, so that, when it is assembled into the cell, the cell produces high output voltage, is stable in its quality, and gives a long service life; and the electrolyte such as phosphoric acid, etc. can be applied and impregnated from both surfaces of the catalyst layer and the matrix layer, hence the time required for application and impregnation of the electrolyte can be shortened.

In the above described embodiments according to the present invention, use is made of the carbon paper as the electrode base 1, which has been rendered water-repellent. It should be noted that there may be used an electrode base of a type, in which the electrolyte is held, such as, for example, the electrode with rib. In this latter case, the electrode base has advantageous effect such that it can sustain more quantity of the electrolyte such as phosphoric acid, etc. for the lacked portion of the catalyst penetrated layer, in comparison with the conventional method, in which the catalyst paste is directly applied onto the electrode base 1.

So far the present invention has been described with particular reference to the preferred embodiments thereof. It should however be understood that these embodiments are merely illustrative of the invention, and not so restrictive, and that any changes and modifications may be made in the material used, the structure of the electrode/matrix combination, and so forth by those persons skilled in the art within the spirit and scope of the present invention as recited in the appended claims.

What is claimed is:

1. An electrode for fuel cell, which comprises in combination: an electrode base, a catalyst layer, and a matrix layer, one part or entire part of said catalyst layer and one part or entire part of said matrix layer being formed in a porous sheet in contiguous relationship, wherein said catalyst layer is composed of a catalyst filled layer formed by filling said porous sheet with catalyst powder and a binding agent from one surface side thereof, and a catalyst adhered layer formed by adhesion of the catalyst powder and the binding agent on the surface of said catalyst filled layer; and said matrix layer is composed of a matrix filled layer formed by filling said porous sheet with a matrix skeletal material and a binding agent from the other surface side thereof, and a matrix adhered layer formed by adhesion of the matrix skeletal material and the binding agent on the surface of said matrix filled layer.

2. An electrode for fuel cell according to claim 1, wherein said porous sheet has porosity of 50% or more.

3. An electrode for fuel cell according to claim 1, wherein said porous sheet is carbon fiber sheet having thickness of from 30 to 300 $\mu$m.

4. An electrode for fuel cell according to claim 1, wherein said catalyst adhered layer has thickness of from 10 to 300 μm.

5. An electrode for fuel cell according to claim 1, wherein said matrix adhered layer has thickness of from 30 to 300 μm.

6. An electrode for fuel cell according to claim 1, wherein the binding agent for said catalyst layer is fluorine-containing resin selected from the group consisting of polytetrafluoroethylene and copolymers of tetrafluoroethylene and hexafluoropropylene.

7. An electrode for fuel cell according to claim 1, wherein the binding agent for said matrix layer is fluorine-containing resin selected from the group consisting of polytetrafluoroethylene and copolymers of tetrafluoroethylene and hexafluoroethylene.

8. An electrode for fuel cell according to claim 1, wherein the binding agent for said matrix layer contains therein hydrophilic thermoplastic resins selected from the group consisting of polyether sulfone, 9. An electrode for fuel cell according to claim 1, wherein the skeletal material for said matrix layer is at least one selected from the group consisting of carbon, inorganic carbides, metal oxides, and metal phosphates, in powder or fiber.

* * * * *